United States Patent
Daugherty

[19]

[11] 3,806,033
[45] Apr. 23, 1974

[54] PULSE JET PRESSURE NOZZLE
[76] Inventor: John F. Daugherty, 310 Bonifant Rd., Silver Spring, Md. 20904
[22] Filed: Nov. 12, 1971
[21] Appl. No.: 198,482

Related U.S. Application Data
[63] Continuation of Ser. No. 8,599, Feb. 4, 1970, abandoned.

[52] U.S. Cl............ 239/222.21, 239/389, 239/523, 239/540
[51] Int. Cl.............................................. B05b 3/04
[58] Field of Search ...... 239/222.21, 380, 381, 382, 239/383, 389, 452, 455, 456, 457, 505, 538, 540, 583, 586, 587, 523

[56] References Cited
UNITED STATES PATENTS
3,358,930    12/1967    Parr ................................ 239/538 X
743,696    11/1903    Dixon ............................ 239/381 X
1,715,140    5/1929    Martin ........................... 239/597 X
1,904,292    4/1933    Duncan ........................ 239/222.21

Primary Examiner—M. Henson Wood, Jr.
Assistant Examiner—Andres Kashikow
Attorney, Agent, or Firm—Harold L. Stowell

[57]    ABSTRACT

A nozzle for providing a pulsed stream of liquid particles comprises a conduit section connectable to a source of pressure liquid and a peripherally notched disk mounted for rotation about an axis normal to the direction of flow in the conduit section with the notched periphery of the disk positioned at the outlet of the conduit section. Advantageously the conduit section is tapered inwardly toward the outlet end thereof to increase the velocity of flow of liquid at the outlet and a deflector member angularly projecting into the stream of liquid downstream of the notched disk.

7 Claims, 7 Drawing Figures

PATENTED APR 23 1974 3,806,033

INVENTOR
JOHN F. DAUGHERTY

BY Stowell & Stowell

ATTORNEYS

PULSE JET PRESSURE NOZZLE

This is a continuation, of U.S. Pat. application Ser. No. 8,599, filed Feb. 4, 1970 now abandoned.

This invention relates to nozzles for providing a high velocity pulsed stream of liquid particles.

Such high velocity pulsed streams of liquid particle are useful in the cleaning of cars, trucks, buses, boats and aircraft, in the cleaning of buildings, including windows, walls and floors thereof, and in washing machines for dishes, utensils, laboratory ware and the like. The nozzles of the invention are also useful in lawn sprinklers, seeding, fertilizing and pesticide applying equipment and in rock and metal cutting and drilling operations.

The nozzles of the invention comprise a conduit section connectable to a source of pressure liquid and a peripherally notched disk mounted for free rotation about an axis normal to the direction of flow of liquid in the conduit section with the notched periphery of the disk positioned in the outlet stream from the conduit section whereby rotation of the disk on its axis is effected by impingement of liquid emerging from the outlet of the conduit section on the periphery of the disk.

In passing the notched periphery of the rotating disk the liquid stream is broken up into pulsed portions of liquid particles or droplets. The size and distribution of the particles in the pulsed stream and the velocity thereof are determined by the shape and arrangement of the notches in the peripheral portion of the rotating disk and the velocity of the stream of liquid impinging thereon, all of which factors may be varied to provide a pulsed liquid particle stream of the desired characteristics.

Advantageously the conduit section of the nozzle is tapered inwardly towards the outlet end of the conduit to increase the velocity of flow of the liquid at the outlet. A deflector member angularly projecting into the stream of liquid particles downstream of the notched disk may be provided.

Means for aerating the liquid stream prior to impingement on the notched disk may be provided separately upstream of the nozzle or may be incorporated in the nozzle structure.

The invention will be more particularly described with reference to the accompanying drawing in which.

Figure 1:
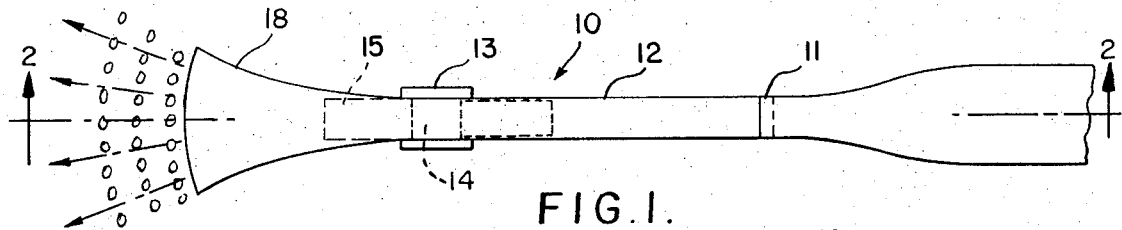
FIG. 1 is a top view of a nozzle embodying the principles of the invention.
Figure 2:
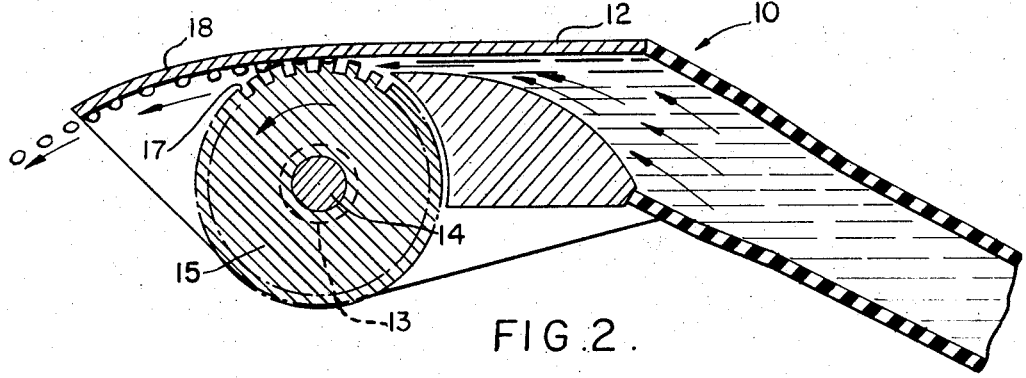
FIG. 2 is an enlarged sectional elevation of the downstream portion of the nozzle on line 2—2 of FIG. 1.

In FIGS. 1 and 2, 10 is the body of the nozzle attachable at 11 to a source of pressure liquid and incorporating a tapered conduit section 12, bearing means 13 supporting the axle 14 of freely rotatable disk 15 having peripheral notches 17 uniformly spaced thereabout, and a downstream deflector member 18.

As shown in FIG. 2, the pulser disk 15 is formed with the peripheral notches 17 of the same shape and equally spaced about the disk. Other forms and arrangements of the disks are shown in FIGS. 3 through 7.

Figure 3:
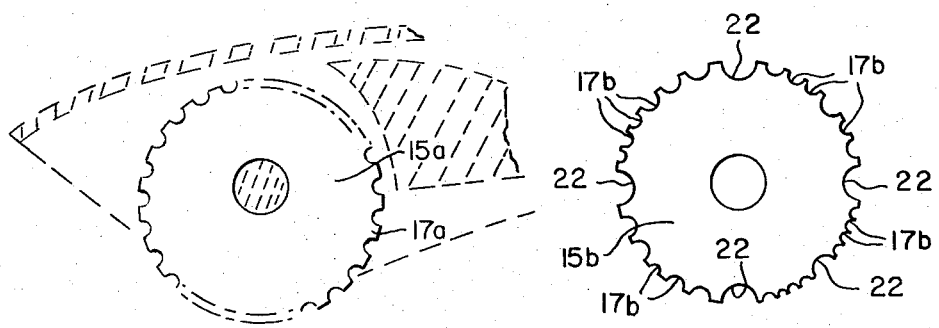
FIG. 3 through FIG. 7 are illustrative of variant forms of peripherally notched disks usable in the nozzle of FIGS. 1 and 2.

In FIG. 3, the disk 15a is formed with notches generally designated 17a of uniform size and with an eccentric bore whereby on rotation about axle 14 the periphery of the disk approaches and recedes from the upper portion of conduit section 12 on each revolution.

Figure 4:
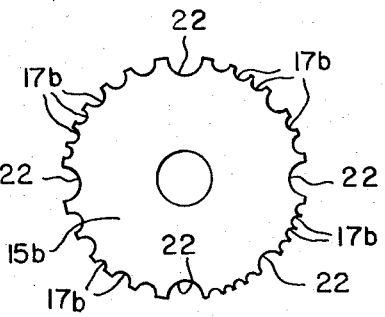

In FIG. 4, the disk 15b is provided with a number of relatively large segments or notches 22 which are randomly spaced about the periphery and between each of the relatively large notches 22 are a varying number of smaller notches generally designated 17b to thereby provide a liquid pulser having a random pattern.

Figure 5:
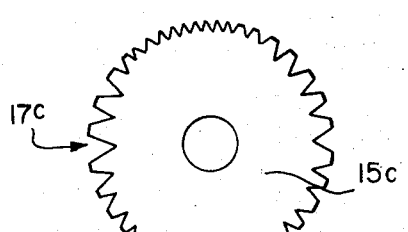

In FIG. 5, the disk 15c has notches generally designated 17c which vary regularly in size and spacing about the disk.

Figure 6:
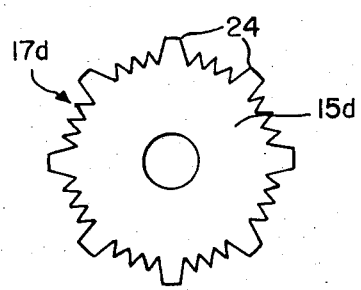

The disk 15d, illustrated in FIG. 6 of the drawing, has notches generally designated 17d which are grouped in eight spaced banks, one bank of which is designated 24 thereby providing high frequency liquid pulses imposed on carrier pulses of low frequency.

Figure 7:
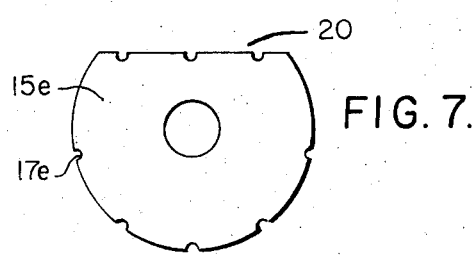

Disk 15e, shown in FIG. 7, is provided with a substantial peripheral gap 20 whereby a single strong pulse occurs in each revolution of the disk, the notches 17e primarily maintaining the rotation of the disk.

While the pulse patterns provided by disks 15a, b, c, d and e differ from the pulse pattern provided by disk 15, illustrated in FIGS. 1 and 2, the function of the disks of FIGS. 3 through 7 in the apparatus shown in FIGS. 1 and 2 is the same.

I claim:

1. A pulse jet pressure nozzle comprising a pressure liquid confining conduit section having an inlet end connectable to a source of pressure liquid, a pulse producing zone and a pulse jet outlet end, a disk, a plurality of peripheral notches each extending from face to face in said disk, said peripherally notched disk mounted for rotation about an axis normal to the direction of flow of pressure liquid through the pulse producing zone of the conduit section with the notched periphery of the disk positioned in the outlet stream from the conduit section whereby rotation of the disk on its axis is effected by impingement of liquid emerging from the inlet end of the conduit section on the periphery of the disk, and a deflector plate mounted tangentially contiguous to the disk, whereby the liquid is ejected in pulses caused by the filling of the notches in the disk with portions of the liquid spaced apart by the intermediate peaks of the disk.

2. A pulse jet pressure nozzle as defined in claim 1 wherein the conduit section is tapered inwardly toward the outlet end thereof to increase the velocity of flow of liquid at the outlet thereof.

3. A pulse jet pressure nozzle as defined in claim 1 having a deflector member angularly projecting into the stream of liquid downstream of the notched disk.

4. A pulse jet pressure nozzle as defined in claim 1 wherein the notches are similarly shaped and regularly disposed about the periphery of the disk.

5. A pulse jet pressure nozzle as defined in claim 1 wherein the shape of the notches is varied about the periphery of the disk.

6. A pulse jet pressure nozzle as defined in claim 1 wherein the spacing of the notches is varied about the periphery of the disk.

7. A pulse jet pressure nozzle as defined in claim 1 wherein the disk is mounted eccentrically of the periphery thereof.

* * * * *